(12) United States Patent
Shah et al.

(10) Patent No.: US 7,024,479 B2
(45) Date of Patent: Apr. 4, 2006

(54) FILTERING CALLS IN SYSTEM AREA NETWORKS

(75) Inventors: Hemal V. Shah, Hillsboro, OR (US); Annie Foong, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 691 days.

(21) Appl. No.: 09/768,375

(22) Filed: Jan. 22, 2001

(65) Prior Publication Data

US 2002/0099827 A1 Jul. 25, 2002

(51) Int. Cl.
G06F 15/16 (2006.01)

(52) U.S. Cl. ............ 709/227; 709/230; 709/246; 709/223

(58) Field of Classification Search ........ 709/220, 709/226, 249, 244, 246, 238, 230, 227
See application file for complete search history.

(56) References Cited

U.S. PATENT DOCUMENTS

| | | | |
|---|---|---|---|
| 5,485,460 A | 1/1996 | Schrier et al. | |
| 5,568,487 A * | 10/1996 | Sitbon et al. | 370/466 |
| 5,610,905 A | 3/1997 | Murthy et al. | |
| 5,619,650 A * | 4/1997 | Bach et al. | 709/246 |
| 5,721,872 A | 2/1998 | Katsuta | |
| 5,721,876 A | 2/1998 | Yu et al. | |
| 5,941,988 A | 8/1999 | Bhagwat et al. | |
| 6,003,084 A | 12/1999 | Green et al. | |
| 6,006,268 A | 12/1999 | Coile et al. | |
| 6,075,796 A | 6/2000 | Katseff et al. | |
| 6,081,900 A * | 6/2000 | Subramaniam et al. | 713/201 |
| 6,115,384 A | 9/2000 | Parzych | |
| 6,131,163 A | 10/2000 | Wiegel | |
| 6,145,031 A * | 11/2000 | Mastie et al. | 710/52 |
| 6,151,688 A | 11/2000 | Wipfel et al. | |
| 6,154,743 A * | 11/2000 | Leung et al. | 707/10 |
| 6,192,362 B1 * | 2/2001 | Schneck et al. | 707/10 |
| 6,212,550 B1 * | 4/2001 | Segur | 709/206 |
| 6,347,337 B1 | 2/2002 | Shah et al. | |
| 6,438,652 B1 | 8/2002 | Jordan et al. | |
| 6,460,080 B1 | 10/2002 | Shah et al. | |
| 6,480,901 B1 * | 11/2002 | Weber et al. | 709/246 |
| 6,493,343 B1 | 12/2002 | Garcia et al. | |
| 6,546,423 B1 | 4/2003 | Dutta et al. | |
| 6,549,937 B1 * | 4/2003 | Auerbach et al. | 709/206 |
| H2065 H | 5/2003 | Hong et al. | |
| 6,609,148 B1 | 8/2003 | Salo et al. | |
| 6,614,808 B1 | 9/2003 | Gopalakrishna | |
| 6,615,201 B1 * | 9/2003 | Seshadri et al. | 707/2 |
| 6,625,258 B1 * | 9/2003 | Ram et al. | 379/88.13 |
| 6,665,674 B1 * | 12/2003 | Buchanan et al. | 707/10 |
| 6,694,375 B1 * | 2/2004 | Beddus et al. | 709/249 |

(Continued)

OTHER PUBLICATIONS

"Resonate White Paper", Central Dispatch 3.0, White Paper—Dec. 1999, pp. 1-9.

(Continued)

Primary Examiner—Bunjob Jaroenchonwanit
Assistant Examiner—Dohm Chankong
(74) Attorney, Agent, or Firm—Fish & Richardson P.C.

(57) ABSTRACT

Application node processors examine application calls and file descriptors associated with application calls in system area networks, determine how to process the application calls based on examining calls and file descriptors and either translate the application call to a lightweight protocol or process the call using the application node operating system.

23 Claims, 28 Drawing Sheets

U.S. PATENT DOCUMENTS

| | | | |
|---|---|---|---|
| 6,708,223 | B1 | 3/2004 | Wang et al. |
| 6,711,162 | B1 | 3/2004 | Ortega et al. |
| 6,721,334 | B1 | 4/2004 | Ketcham |
| 6,745,243 | B1 | 6/2004 | Squire et al. |
| 6,754,696 | B1* | 6/2004 | Kamath et al. ............. 709/213 |
| 6,882,654 | B1 | 4/2005 | Nelson |
| 2001/0034782 | A1* | 10/2001 | Kinkade ..................... 709/219 |
| 2002/0055993 | A1 | 5/2002 | Shah et al. |
| 2002/0059451 | A1* | 5/2002 | Haviv ........................ 709/238 |
| 2002/0072980 | A1* | 6/2002 | Dutta .......................... 705/26 |
| 2002/0099827 | A1 | 7/2002 | Shah et al. |
| 2002/0099851 | A1 | 7/2002 | Shah et al. |

OTHER PUBLICATIONS

Song et al., "Design Alternatives for Scalable Web Server Accelerators", Proc. of IEEE International Symposium on Performance Analysis of Systems and Software, 2000, pp. 1-20.

Shah et al., "Design and Implementation of Efficient Communication Abstractions over the Virtual Interface Architecture: Stream Sockets and RPC Experience", Software-Practice and Experience, Softw. Pract. Exper., 00(SI), 1-20 (1999).

Yang et al., "Efficient Support for Content-Based Routing in Web Server Clusters", Proceedings of USITS' 99:The 2nd USENIX Symposium on Internet Technologies & Systems, Boulder, Colorado, U.S.A., Oct. 11-14, 1999, (13 pages).

Maltz et al., "Improving HTTP Caching Proxy Performance with TCP Tap", Proceedings of the Fourth International Workshop on High Performance Protocol Architectures, pp 98-103, Jun. 1998.

Khattar et al., "Introduction to Storage Area Network, SAN", IBM International Technical Support Organization, Aug. 1999.

Maltz et al., "TCP Splicing for Application Layer Proxy Performance", Mar. 1998 (13 pages).

"Virtual Interface Architecture Specification", Version 1.0, Dec. 16, 1997, pp. 1-83.

"Winsock Direct Specification", obtained in 2000 from website http://support.microsoft.com/support/kb/articles/Q260/1/76.ASP?LN=EN=US&SD=Gn&FR=0&gry=SAN%20direct%20path&rnk=1&src=DHCS_MSPSS_gn_SRCH&SPR=WIN2000, Publication Date Unknown, 6 pages.

IBM Global Services-End-To-End Services For Multivendor Storage Area Network (SANS), http://www-1.ibm.com/services/its/us/sanwp2.html, Printed Oct. 17, 2000, pp. 1-6.

Strategic Research Corporation—White Paper—Storage Area Networking, http://www.sresearch.com/wp_9801.htm, Jan. 1998, pp. 1-7.

Newton, Harry. "Newton's Telecom Dictionary", 2003, 19th Edition, p. 624.

Cohen et al., "On the Performance of TCP Splicing for URL-aware redirection", Proceedings of USITS' 99: The 2nd USENIX Symposium on Internet Technologies & Systems, Boulder, Colorado, USA, Oct. 11-14. 1999, 10 pages.

Cisco Local Director Installation and Configuration Guide, Nortel Networks, Feb. 1999, 13 pages.

Pai et al., "Locality-Aware Request Distribution in Cluster-based Network Servers", Proceedings of Eighth International Conference on Architectural Support of Programming Languages and Operating Systems (ASPLOS-VIII), San Jose, CA, Oct. 1998, pp. 1-12.

Accelar 700 Server Switch Series White Paper, pp 1-16, Feb. 1999.

Internet print out on BIG-IP® Controller, 1999, 15 pages.

"Resonate White Paper", Resonate Central Dispatch 3.3, Oct. 2000, pp. 1-12.

Apostolopoulos et al., "Design, Implementation and Performance of a Content-Based Switch".

Michel Susai, "Web Transaction Management Opens Internet Bottlenecks", Technology Backgrounder, May 2000.

"WebScaler Internet Traffic Surge Protection", Sep. 2000.

Cisco Systems, Cisco Local Director. http://www.cisco.com/warp/public/cc/pd/si/1000/i.

Camarda et al. "Performance Evaluation of TCP/IP Protocol Implementation in End Systems", IEEE Proc. Comput. Digit. Tech. vol. 146, Jan. 1999.

Edith Cohen et al., "Managing TCP Connections under Persistent HTTP", Proc. Of the Eighth International World Wide Web Conf., 1999.

D. Dunning G. Regnier, G. McAlpine et al., "The Virtual Interface Architecture", IEEE Micro, vol. 3, No. 2, pp. 66-76, 1998.

A. Fox et al., "Cluster-Based Scalable Network Services", Proc. Of the sixteenth ACM Symp. On Operating systems principles, pp. 78-91, 1997.

Infiniband Arch. Spec. vol. 1, Rel. 1.0a.

Infiniband Arch. Spec. vol. 2. Rel. 1.0a.

H. Shah, C. Pu, and R. Madukkarumukumana, "High Performance Sockets and RPC over Virtual Interface (VI) Architecture", In Proc. Third Intl. Workshop on Communication, Architecture, and Applications for Network Based Parallel Computing, pp. 91-107, 1999.

Evan Speight, Hazim Abdel-Shafi, and John K. Bennett, "Realizing the Performance Potential of the Virtual Interface Architecture", In Proc. Of the 13th ACM-SIGARCH International Conference on Supercomputing, Jun. 1999.

Oliver Spatscheck et al., "Optimizing TCP Forwarder Performance", In IEEE/ACM Tran. Of Networking, vol. 8, No. 2, Apr. 2000.

Virtual Interface Architecture Developer Guide, Intel Corporation, Revision 1.0, Sep. 9, 1998.

G. Welling, M. Ott, and S. Mathur, "CLARA: A Cluster-Based Active Router Architecture", Hot Interconnects 8, pp. 53-60, 2000.

Windows Sockets Direct Path for System Area Networks, Microsoft Corporation, 2000.

Alacritech, Alacritech Server Network Adapters, http://www.alacritech.com/html/products.html.

Direct Access File Systems (DAFS). http://www.dafscollaborative.org.

Alteon WebSystems, Alteon Web Switching Products. http://www.alteonwebsystems.com/products/.

IntevIXP1200 Network Processor. http://developer.intel.com/design/network/products/npfamily/ixp1200.htm.

ArrowPoint Communications, ArrowPoint Content Smart Web Switches. http://www.arrowpoint.com/produts/index.html.

F5 Networks, BIG-IP Products. http://www.f5labs.com/f5products/bigip.

Giganet, Inc., Giganet cLAN Product Family. http://www.giganet.com/products/.

Interprophet Corporation. http://www.interprophet.com/.

Netscaler, WebScaler Internet Accelerator. http://www.netscaler.com/products.html.

Alteon WebSystems, Next Generation Adapter Design and Optimization for Gigabit Ethernet.

Hemal V. Shah et al., "CSP: A Novel System Architecture for Scalable Internet and Communication Services", Proceedings of the 3rd USENIX Symposium on Internet Technologies and Systems, Mar. 26-28, 2001 p. 61-72.

Speight et al., 4th USENIX Windows Systems Symposium Paper 2000, pp. 113-124 of the Proceedings, Aug. 3-4, 2000.

* cited by examiner

| Message Type | Description |
|---|---|
| JOIN_SERVICE | Sent by an application node when joining a group of service offered by SAN proxies. |
| LEAVE_SERVICE | Sent by an application node when leaving a group of service offered by SAN proxies. |
| SHUTDOWN_SERVICE | Sent by a SAN proxy when it shuts down a service |
| CONNECTION_REQUEST | Sent by a SAN proxy with flow identifier to an application node indicating that the proxy received a connection request from a client. Also, sent by an application node to actively open a connection. |
| ACCEPT_CONNECTION | Sent by an application node (SAN proxy) to positively acknowledge to a SAN proxy (application node) regarding the acceptance of a connection request. |
| REJECT_CONNECTION | Sent by an application node (SAN proxy) to negatively acknowledge to a SAN proxy (application node) regarding a connection request. |
| CLOSE_CONNECTION | Sent by an application node (SAN proxy) to SAN proxy (application node) for closing a connection. |
| CREDIT_CONNECTION | Used to request credit information. |
| CREDIT_RESPONSE | Used to send credit information. |
| DATA | |

*FIG. 5B*

```
socket() → sf_socket(domain, service, protocol) { if (this is a TCP socket) { if (called for the first time) { perform SAN transport initialization;
            Start up SAN Transport;

fd = socket (domain, service, protocol);
            Note fd of first socket call;
            return(fd);
        }
        else {
            fd = socket (domain, service, protocol);
            return(fd);
        }
    }
    else
        return (socket (domain, service, protocol) );
}
```

FIG. 6A

```
bind() → sf_bind (fd, sockaddr, addrlen) {

Note IP address & port #;

if (this is a TCP socket) { if (port is specified)
            note fd as service fd for this port;

return (bind (fd, sockaddr, addrlen));

} else
        return (bind (fd, sockaddr, addrlen));
}
```

*FIG. 6B*

```
connect() → sf_connect (fd, sockaddr, addrlen) {

Note IP address & port #;

if (this is a TCP socket) { if (this is a non-blocking socket) { if (CONNECTION_REQUEST msg not previously sent for this fd)
            send CONNECTION_REQUEST msg with fd to proxy node;

if (ACCEPT_CONNECTION or REJECT_CONNECTION msg is pending) { if (receive ACCEPT_CONNECTION msg) {
                assign mapped fd by mapping OS-assigned fd to a transport fd;
                return (success);
            }
            else
                return (connection refused error);
        }
        else
            return (connection in progress);
    }
    else {
        send CONNECTION_REQUEST msg with fd to proxy node;
        wait to receive (ACCEPT_CONNECTION or REJECT_CONNECTION msg);

if (receive ACCEPT_CONNECTION msg) {
            assign mapped fd by mapping OS-assigned fd to a transport fd;
            return (success);
        }
        else
            return (connection refused error);
    }
}
else
    return (connect (fd, sockaddr, addrlen));
}
```

*FIG. 6C*

```
listen() --> sf_listen(fd, backlog) { switch (type of fd) { case service fd:
        send JOIN_SERVICE msg;
        return (success);

case mapped fd:

case transport fd:
        return (exception error);

default:
        return ( listen(fd, backlog));
    }
}
```

*FIG. 6D*

```
accept() --> sf_accept (fd, clientaddr, len) { switch (type of fd) { case service fd:

if (this is a non-blocking socket) { if CONNECTION_REQUEST msg is pending for this service fd { read CONNECTION_REQUEST msg with proxy-assigned flow id;

if (connection can be accepted) {
                    send ACCEPT_CONNECTION msg;
                    return (flow id);
                }
                else {
                    send REJECT_CONNECTION msg;
                    return (try again);
                }
            }
            else
                return (try again);
        }
        else {
```

FIG. 6E-1

```
while (1) {
    if CONNECTION_REQUEST msg is pending for this service fd {
        read CONNECTION_REQUEST msg with proxy-assigned flow id;
        if (connection can be accepted) {
            send ACCEPT_CONNECTION msg;
            return (flow id);
        }
        else {
            send REJECT_CONNECTION msg;
        }
    }
    else
        wait to receive CONNECTION_REQUEST msg;
} // while loop
} case transport fd:
    return (exception error);
default:
    return ( accept (fd, clientaddr, len));
}
```

FIG. 6E-2

```
select() → sf_select (nfds, readfds, writefds, exceptfds, timeout) { note the number of fds to select on;
set timeslice as a function of timeout and number of fds;

do forever {

// PHASE 1: POLL ALL FDs
  for each service fd in readfds {
    if CONNECTION_REQUEST msg is pending for this service fd
      set corresponding service fd as available;
  } for each transport fd in readfds {
    if DATA msg is pending for this transport fd
      set corresponding transport fd as available;
  } for each mapped fd in readfds {
    perform mapping to transport fd;
    if DATA msg is pending for this transport fd
      set corresponding mapped fd as available;
  } for each transport fd in writefds {
    if DATA msg can be sent on this transport fd
      set corresponding transport fd as available;
  } for each mapped fd in writefds {
    perform mapping to transport fd;
    if DATA msg can be sent for this transport fd
      set corresponding mapped fd as available;
  }
```

FIG. 6F-1

```
for each service fd in exceptfds {
    if exception occurs for this service fd
        set corresponding service fd;
}
for each transport fd in exceptfds {
    if exception occurs for this transport fd
        set corresponding transport fd;
}
for each mapped fd in exceptfds {
    perform mapping to transport fd;
    if exception occurs for this transport fd
        set corresponding mapped fd;
}
for al other fds
    call original system select();

combine all available descriptors;

if (one or more descriptors are ready)
    return (number of descriptors available);
else
    choose one descriptor in readfds to wait on;   // heuristic-based choice restore original descriptor sets;

if (time is up AND no fd is available)
    return (timed out);

// PHASE 2: WAIT if necessary
wait for arrival of CONNECTION_REQUEST, ACCEPT_CONNECTION,
    REJECT_CONNECTION or DATA msg for the chosen descriptor, up to timeslice;
}
```

FIG. 6F-2

```
recv() → sf_recv (fd, buf, len, flags) {
    switch (type of fd) { case service fd:
        return (exception error);

case mapped fd:
        perform mapping to transport fd;

case transport fd:
        if (MSG_WAITALL flag is not set) {
            if at least one DATA msg is pending for this transport fd {
                receive data into buf;
                return (number of bytes read);
            }
            else {
                if (this is a non-blocking socket)
                    return (resource not available);
                else {
                    wait to receive a DATA msg for this transport fd;
                    receive data into buf;
                    return (number of bytes read);
                }
            }
        }
        else {
            wait until all len bytes of DATA msgs for this transport fd arrives;
            receive data into buf;
            return (number of bytes read);
        } default:
        return ( recv (fd, buf, len));
    }
}
```

FIG. 6G

```
send() → sf_send (fd, buf, len, flags) { switch (type of fd) { case service fd:
        return (exception error);

case mapped fd:
        perform mapping to transport fd;

case transport fd:
        if (this is a non-blocking socket){
            if (no DATA msg can be sent at this time)
                return (try again);
            else
                send DATA msg(s) with data from buf in non-blocking fashion;
        }
        else {
            if( no DATA msg can be sent at this time)
                Wait until atleast one DATA msg can be sent;
            send DATA msg(s) with data from buf;
        }
        return (number of bytes sent);

default:
        return (send (fd, buf, len));
    }
}
```

FIG. 6H

```
read() → sf_read (fd, buf, len) {
    switch (type of fd) { case service fd:
        return (exception error);

case mapped fd:
        perform mapping to transport fd;

case transport fd:
        if at least one DATA msg is pending for this transport fd {
            receive data into buf;
            return (number of bytes read);
        }
        else {
            if (this is a non-blocking socket)
                return (resource not available);
            else {
                wait to receive a DATA msg for this transport fd;
                receive data into buf;
                return (number of bytes read);
            }
        } default:
        return ( read (fd, buf, len));
    }
}
```

FIG. 6I

```
write() → sf_write (fd, buf, len) { switch (type of fd) { case service fd:
        return (exception error);

case mapped fd:
        perform mapping to transport fd;

case transport fd:
        if (this is a non-blocking socket) {
            if (no DATA msg can be sent at this time)
                return (try again);
            else
                send DATA msg(s) with data from buf in non-blocking fashion;
        }
        else {
            if( no DATA msg can be sent at this time)
                Wait until atleast one DATA msg can be sent;
            send DATA msg(s) with data from buf;
        }
        return (number of bytes written);

default:
        return (write (fd, buf, len));
    }
}
```

FIG. 6J

```
readv() → sf_readv (fd, vector_buf, vector_count) { switch (type of fd) { case service fd:
        return (exception error);

case mapped fd:
        perform mapping to transport fd;

case transport fd:
        if at least one DATA msg is pending for this transport fd {
            scatter data received into vector_buf;
            return (number of bytes read);
        }
        else {
            if (this is a non-blocking socket)
                return (resource not available);
            else {
                wait to receive a DATA msg for this transport fd;
                scatter data received into vector_buf;
                return (number of bytes read);
            }
        } default:
        return ( readv (fd, buf, len));
    }
}
```

*FIG. 6K*

```
writev() -> sf_writev (fd, vector_buf, vector_count) { switch (type of fd) { case service fd:
        return (exception error);

case mapped fd:
        perform mapping to transport fd;

case transport fd:
        if (this is a non-blocking socket) {
            if (no DATA msg can be sent at this time)
                return (try again);
            else
                send DATA msg(s) with gathered data from vector_buf;
        }
        else {
            if( no DATA msg can be sent at this time)
                Wait until atleast one DATA msg can be sent;
            send DATA msg(s) with gathered data from vector_buf;
        }
        return (number of bytes written);

default:
        return (writev (fd, buf, len));
    }
}
```

FIG. 6L

```
ioctl() → sf_ioctl (fd, request, arg) { switch (type of fd) { case service fd:
        return (socket not connected error);

case mapped fd:
        perform mapping to transport fd;

case transport fd:
        switch (request) { case FIONBIO:
            set non-blocking I/O variable to value in arg;
            return (success);
        case FIOASYNC:
            set async I/O variable to value in arg;
            return (success);
        case FIONREAD:
            peek at DATA msg for this transport fd;
            set number of bytes in arg;
            return (success);
        default:
            return (warning: option not meaningful in SAN Transport);
        } default:
        return (ioctl (fd, request, arg));
    }
}
```

FIG. 6M

```
getsockname() → sf_getsockname (fd, localaddr, addrlen) { switch (type of fd) { case service fd:
    return (socket not connected error);

case mapped fd:
    perform mapping to transport fd;

case transport fd:
    return (local protocol address associated with this transport fd);

default:
    return (getsockname (fd, localaddr, addrlen));
}
}
```

FIG. 6N

```
getpeername() → sf_getpeername (fd, localaddr, addrlen) { switch (type of fd) { case service fd:
        return (socket not connected error);

case mapped fd:
        perform mapping to transport fd;

case transport fd:
        if (information is available from the proxy node)
            return (foreign protocol address associated with this transport fd);
        else
            return (address not available);

default:
        return (getpeername (fd, localaddr, addrlen));
    }
}
```

FIG. 60

```
getsockopt() → sf_getsockopt (fd, level, optname, optval, optlen) { if (level == SOL_SOCKET) { switch (type of fd) { case service fd:
            return (warning: setsockopt() not meaningful for service fd);
        case mapped fd:
            perform mapping to transport fd;

case transport fd:
            switch (optname) {
            case SO_RCVBUF:
            case SO_SNDBUF:
                if (buffering supported by proxy node) {
                    get corresponding state variable and place value in optval;
                    return (success);
                }
                else
                    return (unable to get buffer sizes);

case SO_LINGER:
            case SO_RCVLOWAT:
            case SO_SNDLOWAT:
                get corresponding state variable and place value in optval;
                return (success);
            case SO_TYPE:
                return (SOCK_STREAM);
            default:
                return (warning: option not meaningful in SAN Transport);
    }
```

FIG. 6P-1

```
        default:
            return ( getsockopt(fd, level, optname, optval, optlen) );
    }
} if (level == IPPROTO_TCP) { switch (type of fd) { case service fd:
        return (warning: setsockopt() not meaningful for service fd);
    case mapped fd:
        perform mapping to transport fd;
    case transport fd:
        switch (optname) {
            case TCP_MAXSEG:
                get segment size of SAN transport and place value in optval;
                return (success);
            case TCP_NODELAY:
                if (no-delay option is known) {
                    get value and place in optval;
                    return (success);
                }
                else
                    return (error);

default:
                return (warning: option not meaningful in SAN Transport);
        } default:
        return ( getsockopt(fd, level, optname, optval, optlen) );
    }
}
return (not implemented);
}
```

FIG. 6P-2

```
setsockopt() → sf_setsockopt (fd, level, optname, optval, optlen) {
  if (level == SOL_SOCKET) {
    switch (type of fd) {
    case service fd:
      return (warning: setsockopt() not meaningful for service fd);
    case mapped fd:
      perform mapping to transport fd;
    case transport fd:
      switch (optname) {
      case SO_RCVBUF:
      case SO_SNDBUF:
        if (buffering supported by proxy node) {
          set corresponding state variable to value given by optval;
          communicate buffer size given by optval to proxy node;
          if (communication successful)
            return (success);
          else
            return (unable to set buffer size);
        }
        else
          return (unable to set buffer sizes);

case SO_LINGER:
      case SO_RCVLOWAT:
      case SO_SNDLOWAT:
        set corresponding state variable to value given by optval;
        communicate optname and optval to proxy node;
        if (communication successful)
          return (success);
        else
          return (unable to set option);
```

FIG. 6Q-1

```
        default:
            return (warning: option not meaningful in SAN Transport);
    }
default:
    return ( setsockopt(fd, level, optname, optval, optlen) );
} if (level == IPPROTO_TCP) {
    switch (type of fd) {
    case service fd:
        return (warning: setsockopt() not meaningful for service fd);
    case mapped fd:
        perform mapping to transport fd;
    case transport fd:
        switch (optname) {
        case TCP_MAXSEG:
            set segment size of SAN transport to value given by optval;
            return (success);
        case TCP_NODELAY:
            set no-delay variable to value given by optval;
            communicate optname and optval to the proxy node;
            if (communication successful)
                return (success);
            else
                return (unable to set no-delay option);
        default:
            return (warning: option not meaningful in SAN Transport);
        }
    default:
        return ( setsockopt(fd, level, optname, optval, optlen) );
    }
}
return (not implemented);
}
```

FIG. 6Q-2

```
close() → sf_close (fd) { switch (type of fd) { case service fd:
    send LEAVE_SERVICE msg on service fd;
    clean up transport resources associated with this service;
    return (close(fd));

case mapped fd:
    perform mapping to transport fd;
    send CLOSE_CONNECTION msg on transport fd;
    reset fd mapping;
    return (close (fd));

case transport fd:
    send CLOSE_CONNECTION msg on transport fd;

default:
    return (close(fd));
}
}
```

FIG. 6R

```
shutdown() → sf_shutdown (fd, howto) { if (howto == SHUT_RD) {
   if (fd already closed for writes)
      set full_shutdown_flag to TRUE;
   else
      note that fd is closed for further reads;
} if (howto == SHUT_WR) {
   if (fd already closed for reads)
      set full_shutdown_flag to TRUE;
   else
      note that fd is closed for further writes;
} if (howto == SHUT_RDWR) {
      set full_shutdown_flag to TRUE;
} if (full_shutdown_flag == TRUE) { switch (type of fd) {
      case service fd:
         send LEAVE_SERVICE msg on service fd;
         clean up transport resources associated with this service;
         break;

case mapped fd:
         perform mapping to transport fd;
         send CLOSE_CONNECTION msg on transport fd;
         reset fd mapping;
         break;

case transport fd:
         send CLOSE_CONNECTION msg on transport fd;
         break;

default:
         return ( shutdown (fd, hotwo) );
   }
}
return ( shutdown (fd, howto));

… FILTERING CALLS IN SYSTEM AREA NETWORKS

BACKGROUND

The invention relates to filtering calls in system area networks.

System area networks (SANs) provide network connectivity among nodes in server clusters. Network clients typically utilize Transmission Control Protocol/Internet Protocol (TCP/IP) to communicate with the application nodes. Application node operating systems are responsible for processing TCP/IP packets.

TCP/IP processing demand at the application nodes, however, can slow system operating speeds. To address this, TCP/IP processing functions can be offloaded to remote TCP/IP processing devices. Legacy applications may use remote procedure call (RPC) technology using non-standard protocols to off-load TCP/IP processing.

BRIEF DESCRIPTION OF THE DRAWINGS

FIG. 5B provides functional descriptions of exemplary lightweight protocol message types.
FIGS. 6A–6S are psuedo-code for mapping application calls.

DETAILED DESCRIPTION

Figure 1:
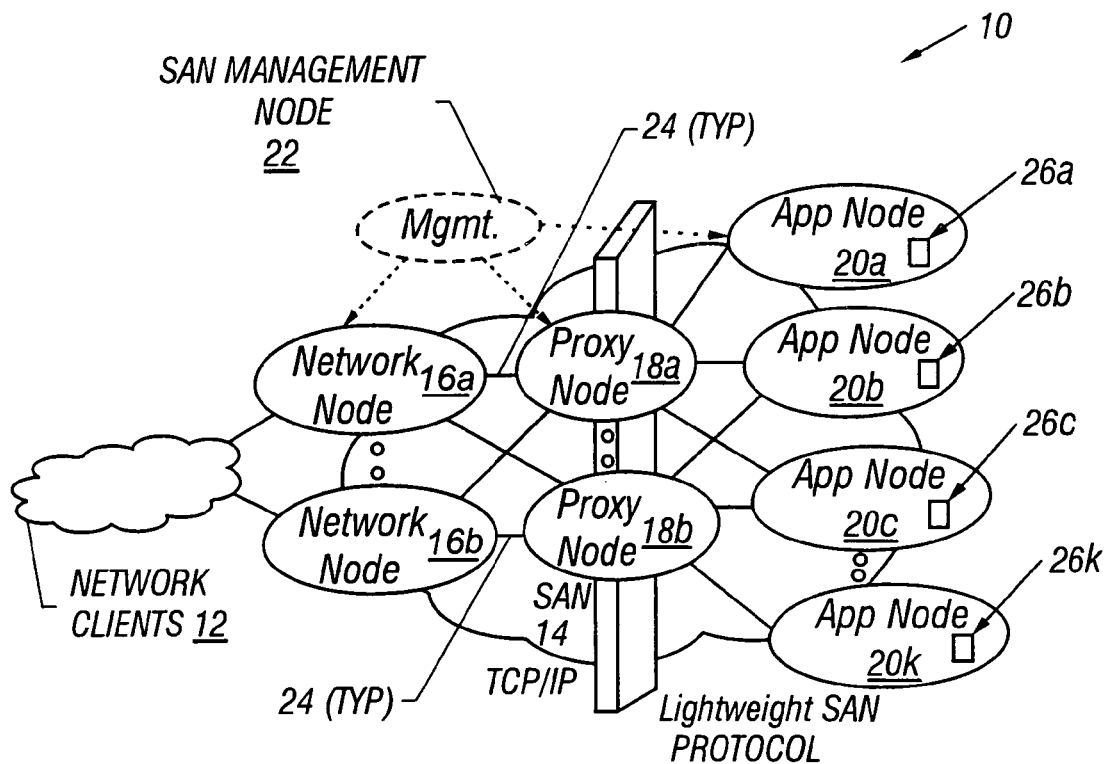
FIG. 1 illustrates a computer system.

The computer system 10 of FIG. 1 includes network clients 12, a system area network (SAN) 14 and a SAN management node 22. The network clients 12 may exist, for example, either on a local area network (LAN) or a wide area network (WAN). The SAN 14 has one or more network nodes 16a . . . 16k, one or more proxy nodes 18a . . . 18k, and one or more application nodes 20a, 20b, 20c . . . 20k.

The network nodes 16a . . . 16k are platforms that can provide an interface between the network clients 12 and the SAN 14. The network nodes 16a . . . 16k may be configured to perform load balancing across multiple proxy nodes 18a . . . 18k. The proxy nodes 18a . . . 18k are platforms that can provide various network services including network firewall functions, cache functions, network security functions, and load balancing logic. The proxy nodes 18a . . . 18k may also be configured to perform TCP/IP processing on behalf of the application nodes 20a, 20b, 20c . . . 20k. The application nodes 20a, 20b, 20c . . . 20k are platforms that function as hosts to various applications, such as a web service, mail service, or directory service. The application nodes 20a, 20b, 20c . . . 20k may, for example, include a computer or processor configured to accomplish the tasks described herein.

SAN channels 24 interconnect the various nodes. SAN channels 24 may be configured to connect a single network node 16a . . . 16k to multiple proxy nodes 18a . . . 18k, to connect a single proxy node 18a . . . 18k to multiple network nodes 16a . . . 16k and to multiple application nodes 20a, 20b, 20c . . . 20k, and to connect a single application node 20a, 20b, 20c . . . 20k to multiple proxy nodes 18a . . . 18k. The SAN channels 24 connect to ports at each node.

Network clients 12 utilize TCP/IP to communicate with proxy nodes 18a . . . 18k via network nodes 16a . . . 16k. A TCP/IP packet may enter the SAN 14 at a network node 16a and travel through a SAN channel 24 to a proxy node 18a. The proxy node 18a may translate the TCP/IP packet into a message based on a lightweight protocol. The term "lightweight protocol" refers to a protocol that has low operating system resource overhead requirements. Examples of lightweight protocols include Winsock-DP Protocol and Credit Request/Response Protocol. The lightweight protocol message may then travel through another SAN channel 24 to an application node 20a.

Data can also flow in the opposite direction, starting, for example, at the application node 20a as a lightweight protocol message. The lightweight protocol message travels through a SAN channel 24 to the proxy node 18a. The proxy node 18a translates the lightweight protocol data into one or more TCP/IP packets. The TCP/IP packets then travel from the proxy node 18a to a network node 16a through a SAN channel 24. The TCP/IP packets exit the SAN 14 through the network node 16a and are received by the network clients 12.

Figure 2:
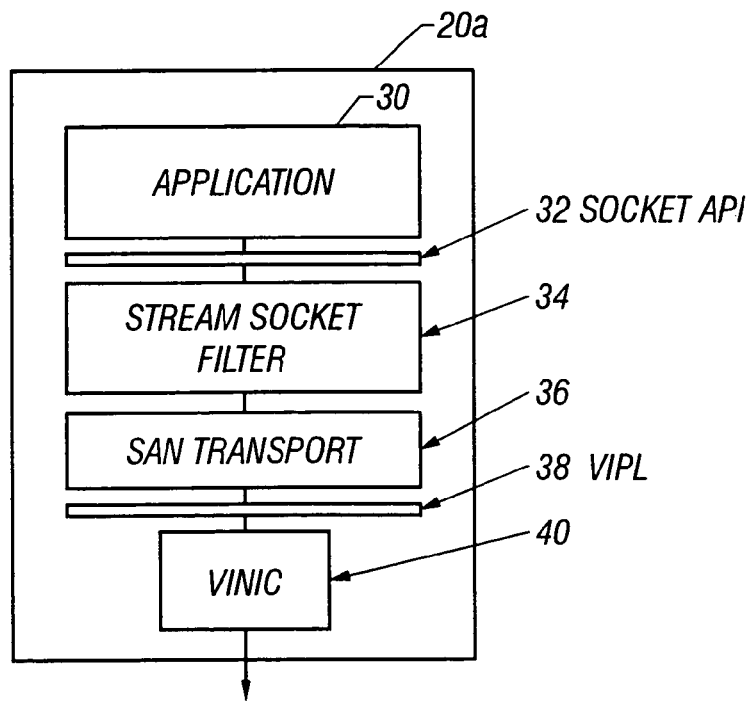
FIG. 2 illustrates an application node.

FIG. 2 shows an architectural view of an application node 20a based on an exemplary SAN hardware that uses a Virtual Interface (VI) Network Interface Card (NIC) 40. Legacy applications 30 traditionally utilize stream sockets application program interface (API) 32 for TCP/IP-based communication.

A stream socket filter 34 transparently intercepts application socket API calls and maps them to lightweight protocol messages communicated to proxy nodes 18a . . . 18k. The stream socket filter 34 provides a technique for applications in application nodes 20a, 20b, 20c . . . 20k to communicate with network clients 12, located external to the SAN 14, via the proxy nodes 18a . . . 18k and the network nodes 16a . . . 16k. The stream socket filter 34 is typically event-driven. A single lightweight protocol message sent or received by the stream socket filter 34 can serve more than one sockets API call. Thus, unnecessary round-trips may be minimized for calls that do not generate any network events. The stream socket filter 34 may reside between an application and a legacy network stack. The stream socket filter 34 may be implemented as a dynamically loadable library module (where supported by the operating system), or as a statically linked library (where recompilation of the source is possible).

The SAN Transport 36, Virtual Interface Provider Library (VIPL) 38, and the Network Interface Card (NIC) 40 are standard components that allow the application node 20a to perform lightweight protocol-based communications.

In legacy applications, sockets are software endpoints used for communications between application nodes 20a, 20b, 20c . . . 20k and network clients 12. Sockets may be opened either actively or passively on an associated file descriptor (socket).

Figure 3:
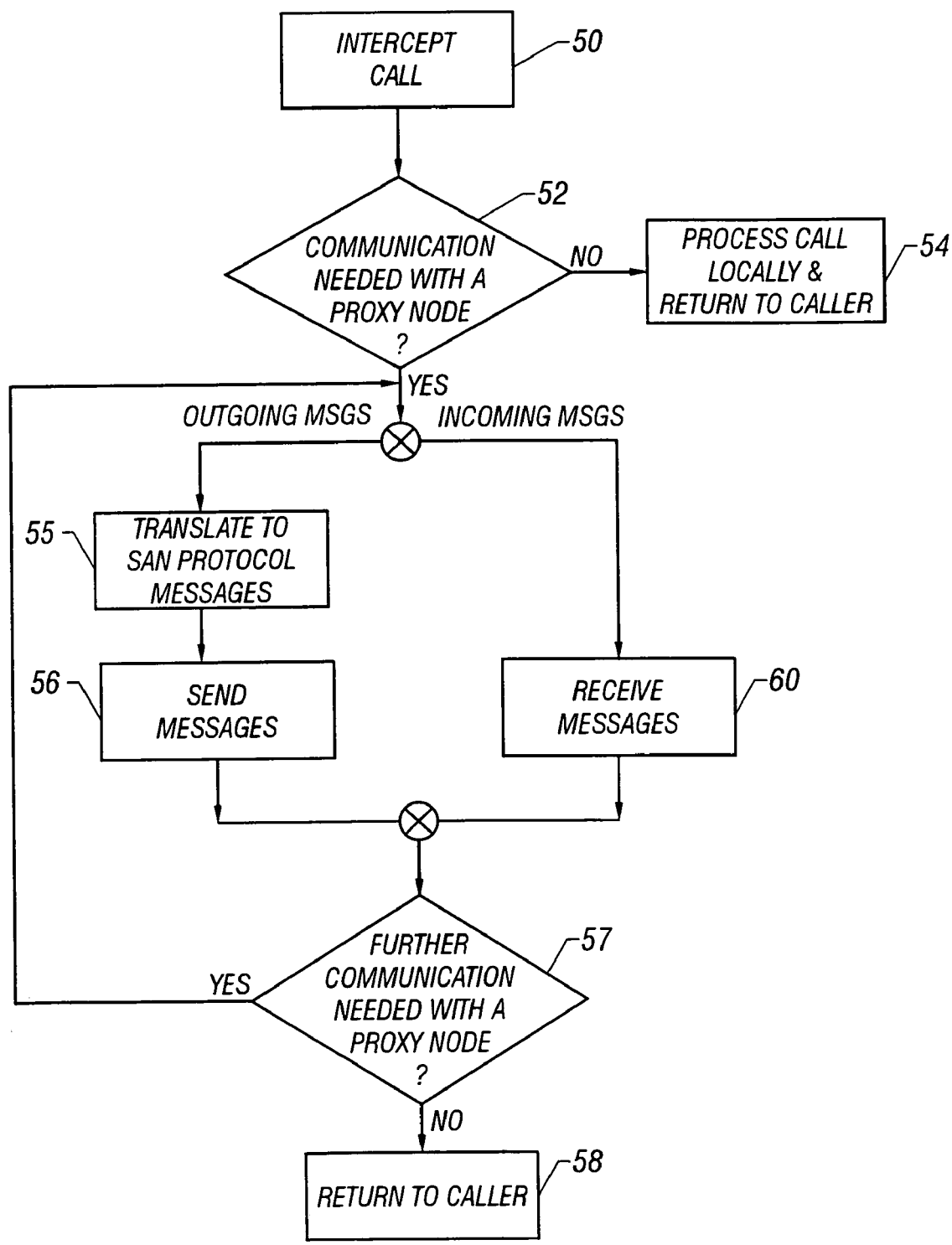
FIG. 3 is a flowchart of a method according to the invention.

Applications 30 issue requests for actions to take place in the form of calls issued on a file descriptor. As shown in FIG. 3, the stream socket filter 34 may intercept 50 an application's call. The stream socket filter then determines 52 whether communication with a proxy node 18a is needed 52 by examining the call issued on a given file descriptor and by examining the file descriptor. If the stream socket filter 34 determines that communication with a proxy node 18a is not needed, then the stream socket filter 34 processes 54 the call locally and returns an appropriate response to the caller. If the stream socket filter 34 determines that communication with the proxy node 18a is required, then for an outgoing message (i.e., a message received from an application 30), the stream socket filter 34 translates 55 the message to a lightweight protocol message and sends 56 the message to a proxy node 18a. If the message is incoming (i.e., received from a proxy node 18a), the stream socket filter 34 receives 60 the lightweight protocol message. The stream socket filter 34 then determines 57 whether further communication is needed with a proxy node 18a. If further communication is required, the stream socket filter 34 repeats the above process. If further communication is not needed with a proxy node 18a, the stream socket filter 34 returns 58 an appropriate response to the caller.

Figure 4A:
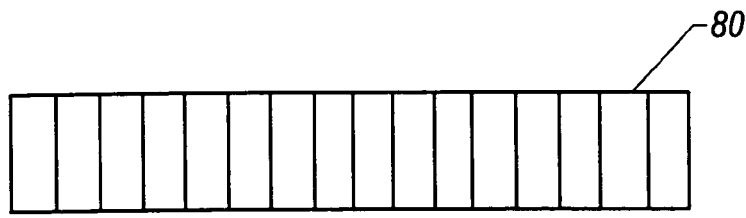
FIG. 4A illustrates a file descriptor.

The stream socket filter 34 determines whether a network event should be generated (block 52) by considering the call issued and the file descriptor. As illustrated in FIG. 4A, the file descriptor 80 can be, for example, a sixteen-bit data structure. The file descriptor may be assigned by the application node's operating system 26a.

Figure 4B:
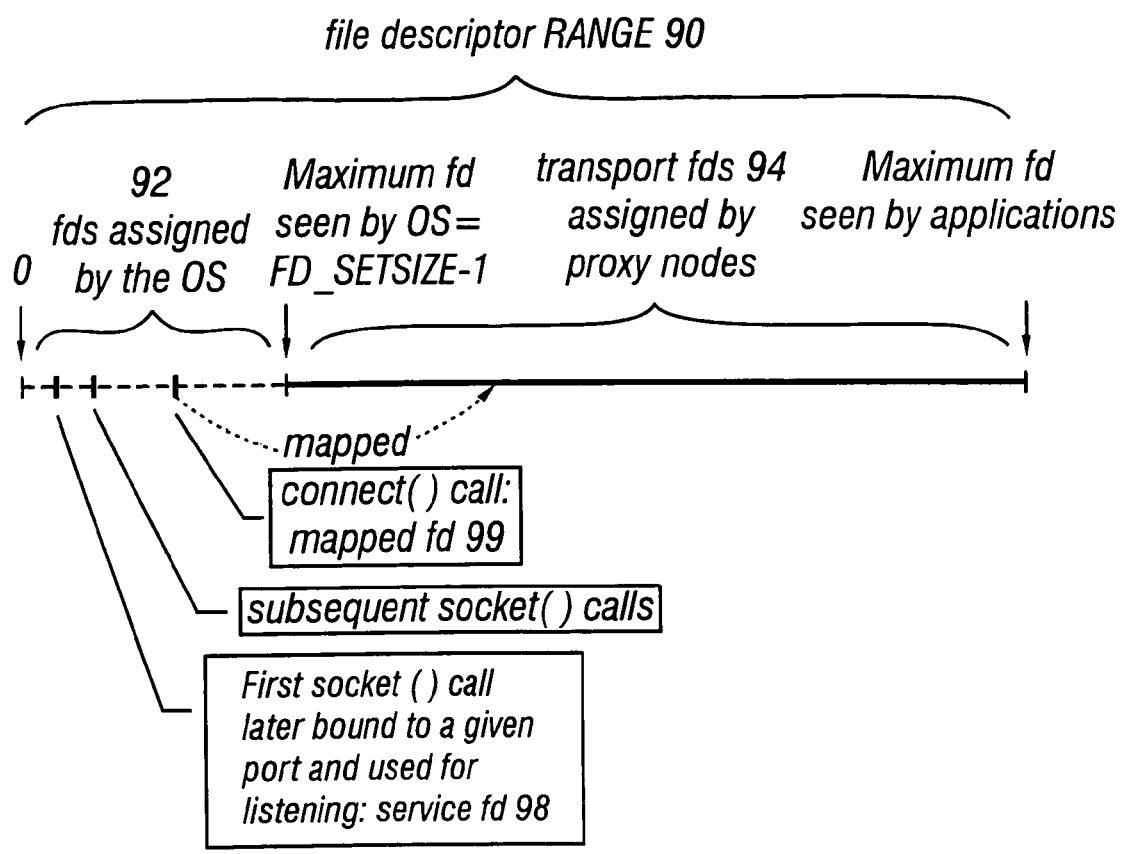
FIG. 4B illustrates partitioning of file descriptors.

As shown in FIG. 4B, the range 90 of available file descriptors includes all valid combinations of data based on a particular data structure. For the sixteen-bit data structure 80 of FIG. 4A, the available file descriptors range from all zeros (binary 0) to all ones (binary 65,535). In order for legacy applications to preserve host operating system descriptors on the application nodes 20a, 20b, 20c . . . 20k, the stream socket filter 34 partitions the 16-bit file descriptor range 90 into traditional file descriptors 92, which are assigned by the operating system; and transport file descriptors 94, which are assigned by the proxy nodes 18a . . . 18k. Each transport file descriptor 94 corresponds to a unique flow identifier (flow id) used by the proxy node 18a in labeling the corresponding TCP flow.

Traditional file descriptors that are assigned by the operating system lie in the range between zero and FD_SET-SIZE−1, which typically has the value of 1023. File descriptors between the value of FD_SETSIZE−1 and 65535 are typically available for use by the proxy node 18a to communicate with the stream socket filter 34.

A socket( ) call in an application typically returns a file descriptor 80 whose value is provided by the application node operating system 26a, 26b, 26c . . . 26k. This file descriptor may be bound to a well-known port for listening on a connection. If this happens, the file descriptor is then categorized as a service file descriptor 98. Service file descriptors 98 may be used to distinguish between different service sessions between an application node 20a and a proxy node 18a. The operating system may also assign file descriptors known as mapped file descriptors 99. Any other file descriptors in the OS-assigned range that are not service file descriptors 98 or mapped file descriptors 99 may typically be used for file input/output or network input/output related functions, usually unrelated to the proxy node 18a or SAN transport 36 functions.

The stream socket filter 34 may use transport file descriptors 94 for both actively and passively opened stream sockets. For passively opened TCP-related sockets, a flow identifier ("flow id") supplied by a proxy node 18a may be returned by the accept( ) call as the file descriptor to be used by the application 30. The file descriptor returned is actually a transport file descriptor 94 taking on the value of the flow id associated with that particular flow. Some applications (e.g. File Transfer Protocol servers) make a connect( ) call to a network client 12 to actively open a socket on the application node 20a. Since the application node operating system 26a typically generates the file descriptor prior to connection establishment, the file descriptor typically needs to be mapped to a transport file descriptor 94 when the connection is finally established. The application may use the operating system 26a assigned mapped file descriptors 99, whereas the stream socket filter 34 may use the corresponding transport file descriptors 99 for communication.

The stream socket filter 34 recognizes which of the categories (system, service, mapped or transport) a particular file descriptor falls under. Based on that categorization and based on the particular call issued, the stream socket filter 34 determines whether a communication with a proxy node 18a is necessary.

Figure 5A:
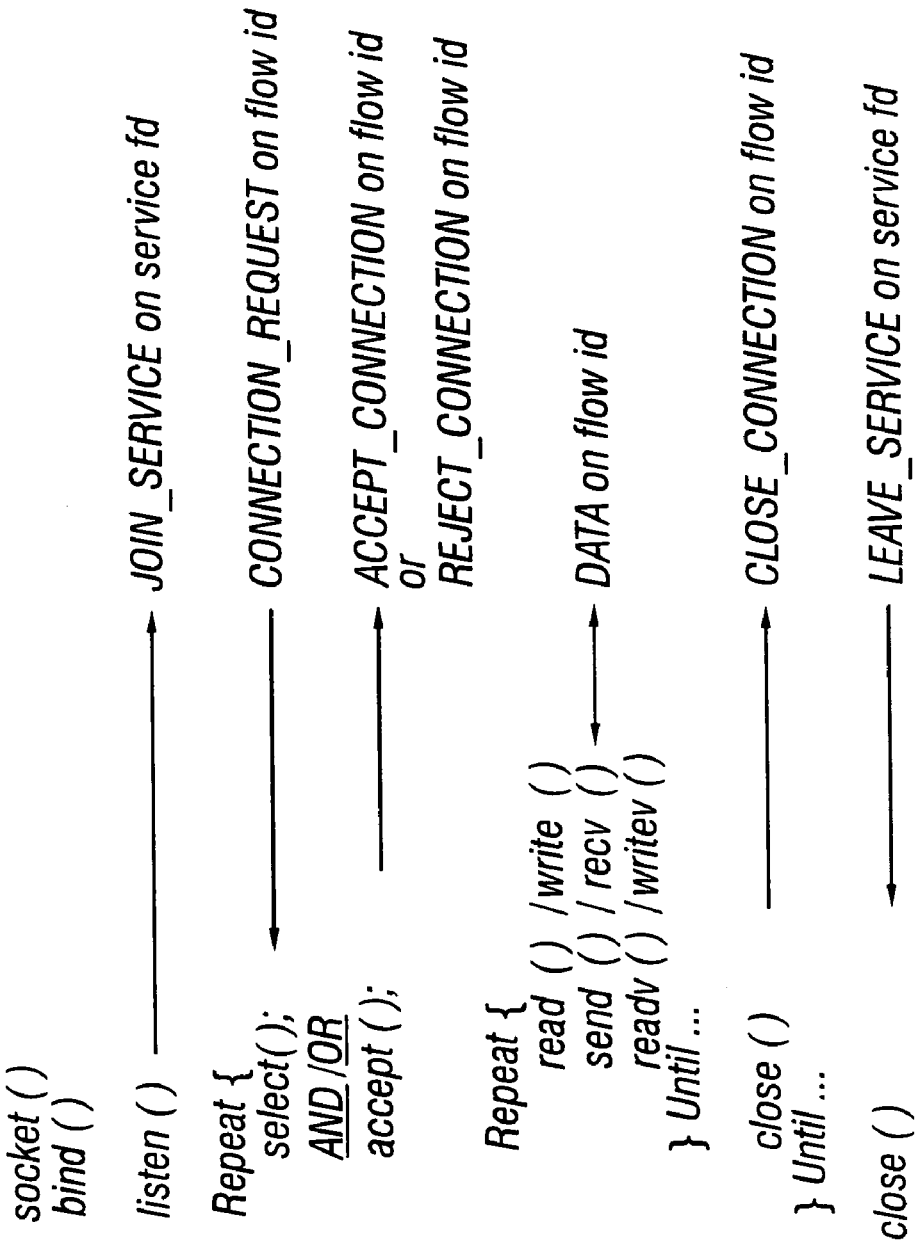
FIG. 5A illustrates a set of exemplary application calls and corresponding lightweight protocol messages.

As shown in FIG. 5A, the left hand column lists a set of calls that an exemplary legacy application 30 might issue. The right hand column lists corresponding lightweight protocol messages that the stream socket filter 34 might issue in response to those calls. Not all application calls require network events. Calls that do not require network events may be processed locally by the application node's operating system 26a.

An application 30 on an application node 20a typically starts a service with a socket( ) call. An endpoint is then initialized. If an application 30 issues a bind( ) call followed by a listen( ) call, the stream socket filter 34 notes the service file descriptor 98 and then sends a JOIN_SERVICE message containing the service file descriptor 98 to the proxy node 18a indicating that the application 30 is ready to provide application services. The application 30 then waits for a network client's 12 request via a select( ) or an accept( ) call. The stream socket filter 34 intercepts the select( ) or accept( ) call and waits for the arrival of a CONNECTION_REQUEST message from the proxy node 18a. The CONNECTION_REQUEST message typically arrives with a flow id assigned by the proxy node 18a, which is then returned to the application 30 in response to the accept( ) call. The application 30 may then use the returned flow id as the transport file descriptor 99 for subsequent reading and writing of data.

The stream socket filter 34 may map read and write calls from the application 30 onto DATA messages. If an application 30 finishes its data transfer on a particular transport file descriptor 94, it typically invokes a close( ) call, which the stream socket filter 34 will translate to a CLOSE_CONNECTION message that is sent to the proxy node 18a. When the application 30 is ready to shutdown its services, it invokes a close( ) call on a service file descriptor 98, which the stream socket filter 34 recognizes, triggering a LEAVE_SERVICE message to be sent to the proxy node 18a, and terminating the services.

Not all application calls generate communication messages. Calls that do not require generating lightweight protocol messages (e.g., socket ( ) and bind ( ) calls) may be processed locally.

FIG. 5B provides descriptions of typical lightweight protocol messages that may be generated in response to application calls.

FIGS. 6A–6S provide exemplary pseudo-code describing typical responses that a stream socket filter 34 may make for exemplary application calls. Each of these figures describes responses to a particular application call issued. Other sockets API calls, particularly setsockopt( ) and getsockopt( ), may primarily set and get the intended behavior of socket operation for the application nodes 20a, 20b, 20c, . . . 20k. These settings may be kept in global state variables, which may or may not have a meaningful impact on the socket-filtered calls, since a reliable SAN Transport may be used in place of TCP. Where necessary, such information may also be relayed to the proxy nodes 18a . . . 18k, as they may be responsible for the TCP connection to the network clients 12, on behalf of the application nodes 20a, 20b, 20c . . . 20k. For data transfer related calls, the pseudo-codes typically assume synchronous operations and fully opened sockets.

Systems implementing the techniques described herein are also capable of implementing techniques for error handling, parameter validation, address checking, as well as other standard techniques.

Systems implementing the foregoing techniques may realize faster SAN 14 operating speeds and improved system flexibility. The techniques described herein may alleviate operating system legacy networking protocol stack on servers bottlenecking for inter-process communication (IPC) in a SAN. Operating system related inefficiencies incurred in network protocol processing, such as user/kernel transitions, context switches, interrupt processing, data copies, software multiplexing, and reliability semantics may be minimized, and may result in an increase in both CPU efficiency and overall network throughput. With TCP/IP processing off-loaded to proxy nodes 18a . . . 18k, a lightweight protocol based on SAN Transport 36 may be used in the SAN 14 and may reduce processing overheads on application servers. The stream socket filter 34 may enable legacy applications that use socket-based networking API to work in a SAN 14 and/or network with non-legacy communication protocols, in conjunction with proxy nodes 18a . . . 18k.

Various features of the system may be implemented in hardware, software or a combination of hardware and software. For example, some aspects of the system can be implemented in computer programs executing on programmable computers. Each program can be implemented in a high level procedural or object-oriented programming language to communicate with a computer system. Furthermore, each such computer program can be stored on a storage medium, such as read-only-memory (ROM) readable by a general or special purpose programmable computer, for configuring and operating the computer when the storage medium is read by the computer to perform the functions described above.

Other implementations are within the scope of the following claims.

What is claimed is:

1. A method comprising:
    examining a call and a file descriptor associated with the call in an application node of a system area network, the call corresponding to an application program interface for a first transport-layer connection-oriented protocol;
    if the call and the file descriptor are of a first type, translating the call to one or more protocol messages recognized by a second node in the system area network, the one or more protocol messages being defined by a second transport-layer connection-oriented protocol, and communicating the one or more protocol messages to the second node for processing according to the first transport-layer connection-oriented protocol;
    wherein the first type comprises transport, being of a partition of a file descriptor range.

2. The method of claim 1 including processing the call using an operating system of the application node if the call and the file descriptor are of a second type.

3. The method of claim 1 including assigning the file descriptor using an operating system of the application node.

4. The method of claim 1 including mapping a communications identifier, received in the application node from the second node and corresponding to a network connection managed by the second node, to the file descriptor.

5. A system area network comprising:
    a first node; and
    an application node including a processor configured for:
    examining a call and a file descriptor associated with the call in an application node of a system area network, the call corresponding to an application program interface for a first transport-layer connection-oriented protocol;
    if the call and the file descriptor are of a first type, translating the call to one or more protocol messages recognized by a second node in the system area network, the one or more protocol messages being defined by a second transport-layer connection-oriented protocol, and communicating the one or more protocol messages to the second node for processing according to the first transport-layer connection-oriented protocol;
    wherein the first type comprises transport, being of a partition of a file descriptor range.

6. The system area network of claim 5 further including a network node, wherein the first node is a proxy node including a processor configured for translating the call to a protocol recognized by the network node.

7. The system area network of claim 5 wherein the processor is further configured for translating a call to a lightweight protocol message.

8. The system area network of claim 5 wherein the processor is further configured for translating a plurality of calls to a single lightweight protocol message.

9. The system area network of claim 5 wherein the processor is further configured for translating the call to a plurality of lightweight protocol messages.

10. The system area network of claim 5 wherein the processor is configured for translating the call to a lightweight protocol message using a lightweight protocol message received from the first node.

11. The system area network of claim 5 wherein the processor is further configured for translating more than one call to a lightweight protocol message using a lightweight protocol message received from the first node.

12. The system area network of claim 5 wherein the processor is further configured for translating the call to a lightweight protocol message using a plurality of lightweight protocol messages received from the first node.

13. The system area network of claim 5 wherein the application node includes an operating system for processing the call if the file descriptor is of a second type.

14. The system area network of claim 5 wherein the application node further includes an operating system for assigning the file descriptor.

15. The system area network of claim 5 wherein the processor is further configured for mapping a communications identifier, received in the application node and corresponding to a network connection managed by the first node, to the file descriptor.

16. An apparatus comprising:
    a port for connecting the apparatus to a system area network; and
    a processor configured for:
    examining a call and a file descriptor associated with the call in an application node of a system area network, the call corresponding to an application program interface for a first transport-layer connection-oriented protocol;

if the call and the file descriptor are of a first type, translating the call to one or more protocol messages recognized by a second node in the system area network, the one or more protocol messages being defined by a second transport-layer connection-oriented protocol, and communicating the one or more protocol messages to the second node for processing according to the first transport-layer connection-oriented protocol;

wherein the first type comprises transport, being of a partition of a file descriptor range.

17. The apparatus of claim 16 further comprising an operating system for processing the call if the call and the file descriptor are of a second type.

18. The apparatus of claim 16 further comprising an operating system for assigning the file descriptor.

19. The apparatus of claim 16 wherein the processor is further configured for mapping a communications identifier, received at the apparatus and corresponding to a network connection managed by the system area network device, to the file descriptor.

20. An article comprising a computer readable medium that stores computer executable instructions for causing a computer system to:

examine a call and a file descriptor associated with the call in an application node of a system area network, the call corresponding to an application program interface for a first transport-layer connection-oriented protocol;

if the call and the file descriptor are of a first type, translating the call to one or more protocol messages recognized by a second node in the system area network, the one or more protocol messages being defined by a second transport-layer connection-oriented protocol, and communicating the one or more protocol messages to the second node for processing according to the first transport-layer connection-oriented protocol;

wherein the first type comprises transport, being of a partition of a file descriptor range.

21. The article of claim 20 further comprising instructions for causing the computer system to process the call using an operating system in the application node.

22. The article of claim 20 further comprising instructions for causing the computer system to assign the file descriptor using an operating system of the application node.

23. The article of claim 20 further comprising instructions for causing the computer system to map a communications identifier, received in the application node and corresponding to a network connection managed by the second node, to the file descriptor.

* * * * *